United States Patent [19]

Kojima

[11] 4,368,533

[45] Jan. 11, 1983

[54] ERROR DATA CORRECTING SYSTEM

[75] Inventor: Tadashi Kojima, Yokosuka, Japan

[73] Assignee: Tokyo Shibaura Denki Kabushiki Kaisha, Japan

[21] Appl. No.: 144,521

[22] Filed: Apr. 28, 1980

[30] Foreign Application Priority Data

May 10, 1979 [JP] Japan ................................. 54-57417

[51] Int. Cl.³ ............................................ G06F 11/10
[52] U.S. Cl. ....................................... 371/37; 371/39
[58] Field of Search ........................ 371/39, 40, 37, 38

[56] References Cited

U.S. PATENT DOCUMENTS

| | | | |
|---|---|---|---|
| 3,418,630 | 12/1968 | Van Duuren | 371/39 |
| 3,629,824 | 12/1971 | Bossen | 371/38 |
| 3,697,948 | 10/1972 | Bossen | 371/38 |
| 3,745,528 | 7/1973 | Patel . | |
| 3,868,632 | 2/1975 | Hong et al. | 371/38 |
| 4,052,698 | 10/1977 | Ragle . | |

FOREIGN PATENT DOCUMENTS

| | | |
|---|---|---|
| 2448255 | 1/1980 | France . |
| 1198510 | 7/1970 | United Kingdom . |
| 1224423 | 3/1971 | United Kingdom . |
| 1313488 | 4/1973 | United Kingdom . |
| 1369725 | 10/1974 | United Kingdom . |
| 1468604 | 3/1977 | United Kingdom . |

OTHER PUBLICATIONS

Art.: "Encoder and Decoder for the 2-Redundant B-Adjacent Perfect Codes" from IBM Technical Disclosure Bulletin, vol. 14, No. 3, pp. 680-682, by D. C. Bossen and A. M. Patel.
Art.: "Optimal Rectangular Code for High Density Magnetic Tapes" from IBM Journal of Research and Development, Nov. 1974, pp. 579-588, by A. M. Patel and S. J. Hong.
Art.: "A General Class of Maximal Codes for Computer Applications" from IEEE Transactions on Computers, vol. C-21, No. 12, Dec. 1972, pp. 1322-1331, by Se June Hong and Arvind M. Patel.

*Primary Examiner*—Charles E. Atkinson
*Attorney, Agent, or Firm*—Finnegan, Henderson, Farabow, Garrett & Dunner

[57] ABSTRACT

A data input signal having n data words and two check words expressed by $W_1$ to WnPQ as one block is applied through a $T^{-(n+1)}$ operation circuit to a Q register where it is processed for a Q decoding. The data input signal is applied to a P register where it is processed for a P decode. Through those processings, the syndrome $S_1$ derived from a P register and $T^{c-(n+1)}S_2$ obtained by shifting the $Q_1$ register in accordance with the first error word summed by the Q register. $S_1 + T^{c-(n+1)}S_2$ as the result of the addition is multiplied by the matrix data for decoding a specific bit, which is derived from a matrix generating circuit, in a multiplier gate circuit, so that it is decoded as the corrected data $W_{de}$ of the second error word Wd'. Then, the corrected data Wce is applied to a buffer circuit. In this case, the matrix generating circuit generates matrix data for decoding a specific bit by using interval data k representing the interval between the first error word Wc' and the second error word Wd'. The $S_1$ is inputted into the buffer circuit. The $W_{dc}$ and the corrected data $W_{ce}(=S_1+W_{de})$ of the first error word $W_{c'}$ are read out from the buffer circuits, through gate circuits for multiplication and a gate circuit for addition. Those are added to the corresponding information words Wc and Wd of the input data signal coming through one block delay, by a gate circuit for addition, as that the error data is corrected.

5 Claims, 7 Drawing Figures

ERROR DATA CORRECTING SYSTEM

FIELD OF THE INVENTION

The invention relates to an error data correcting system adaptable for a system for transmitting, recording and reproducing digitized information signals by PCM (pulse code modulation), for example, and, more particularly, to improvements over an M matrix generator used in the error data correcting system.

BACKGROUND OF THE INVENTION

In an error data correcting system of this type, which has been proposed heretofore in this field, n data words W1 to Wn each containing m/n bits and additionally include a first check code $$\left( P = \sum_{r=1}^{n} \phi W_r \right)$$

as the sum of bits corresponding to the data words and a second check code $$\left( Q = \sum_{r=1}^{n} \phi T^{(n+1)-r} W_r \right)$$

as the sum of the bits corresponding to the signals generated through the operation of a polynomial $X^m + X^g + 1$ by an auxiliary matrix (T). The error data correcting system can correct up to two error words in the N data words by using an M matrix generator for decoding.

A ROM (read only memory) has generally been used from the M matrix generator for decoding, because of the time restriction in the decoding process.

In the case of an audio PCM recorder such as a record/reproduction system, one word commonly includes 12 to 16 bits. If the error data correcting system is applied to such a system, the memory capacity of the ROM that is used must be very large and an address counter capable of formulating the large address fields for the ROM is needed. The circuit construction for such an overall system is complicated. Additionally, very large number of components is necessary when the circuit is fabricated by LSI technology.

OBJECTS OF THE INVENTION

Accordingly, an object of the invention is to provide an error data correcting system using a relatively simple decoding matrix generating circuit in place of a decoding M matrix generator having ROM and an address counter.

Another object of the invention is to provide an error data correcting system with a decoding matrix generating circuit that results in a considerable reduction of the number of the components normally required when fabricating the circuit by LSI technology.

According to the invention, there is provided an error data correcting system in which n data words (W1) to (Wn) each including m bits additionally have a check code $$\left( P = \sum_{r=1}^{n} \phi W_r \right)$$

as an addition of the bits corresponding to the data words and another check code $$\left( Q = \sum_{r=1}^{n} \phi T^{(n+1)-r} W_r \right)$$

as an addition of the bits corresponding to the signals formed through the operation by an auxiliary matrix (T) of a polynomial $X^m + X^g + 1$, the error words being corrected by using a matrix generator for decoding, wherein a matrix generating circuit for generating only the matrix data to decode a specific bit of an M matrix is used as decoding matrix generator and a given operation is made of the check code while the matrix data is fixed.

With such a construction, the decoding matrix data may comprise a single bit, so there is no need for storing all matrix data in a read only memory (ROM). Accordingly, a ROM and an address counter associated with the ROM are not needed, with the result that the circuit construction is simplified and the number of elements necessary when the circuit is fabricated by LSI technology is considerably reduced.

Other objects and features of the invention will be apparent from the following description taken in connection with the accompanying drawings, in which:

DETAILED DESCRIPTION OF THE INVENTION

It is assumed that n data words and two parity check codes are expressed below and that each data word is comprised of m bits.

$$\underbrace{W1, W2, \ldots Wn}_{\text{Data words}} \quad \underbrace{P, Q}_{\text{Check words}}$$

Here codes P and Q of the check words are expressed by $$P = \sum_{r=1}^{n} \phi W_r = W1 \oplus W2 \oplus \ldots \oplus Wn \quad (1)$$

$$Q = \sum_{r=1}^{n} \phi T^{(n+1)-r} W_r \quad (2)$$

-continued $$= T^n W_1 \oplus T^{n-1} W_2 \oplus T^{n-2} W_3 \ldots \oplus T W_n$$

The parity check matrix of those codes is $$H \begin{bmatrix} \overbrace{I\ I\ I\quad I\ I\ O}^{n} \\ T^n\ T^{n-1}\ T\ O\ I \end{bmatrix}$$

where T is a Q generator matrix and I is a unit matrix.

This will be further described. Rewriting the equations (1) and (2), we have $$P \oplus \sum_{r=1}^{n} \phi\, Wr = 0 \qquad (3)$$

$$Q \oplus \sum_{r=1}^{N} T^{(N+1)-r} Wr = 0 \qquad (4)$$

When the ith and jth data are dropped, the solutions of the equations (3) and (4) are not "0" but syndromes $S_1$ and $S_2$ given by equations (5) and (6). Assuming again that the original series of data words is expressed by $W_1$, $W_2$-$(W_i)$-$(W_j)$-$W_n$ and the series of data words of which the ith and the jth data are dropped is expresed by $W'_1$, $W'_2$-$(W'i)$-$(W'j)$-$W'n$, and that $W'i = Wi + Wie$, $W'j = Wj + Wje$, and $W' = W$.

$$P \oplus \sum_{r=1}^{n} \phi\, W'r = S_1 \qquad (5)$$

$$Q \oplus \sum_{r=1}^{n} \phi\, T^{(n+1)-r} W'r = S_2 \qquad (6)$$

Further $$P \oplus \sum_{r=1}^{n} \phi\, W'r = Wie \oplus Wje = S_1 \qquad (7)$$

$$Q \oplus \sum_{r=1}^{n} \phi\, T^{(n+1)-r} W'r = T^{(n+1)-i} Wie \oplus T^{(n+1)-j} Wje = S_2 \qquad (8)$$

From the equation (7), we have $$W_{ie} = S_1 \oplus W_{je} \qquad (9)$$

putting the equation (9) into the equation (8), we have $$S_2 = T^{(n+1)-i}(S_1 \oplus Wje) \oplus T^{(n+1)-j} Wje \qquad (10)$$

This equation can be rewritten as $$T^{-(n+1)} S_2 = S_1 \oplus Wje \oplus T^{-j} Wje \qquad (11)$$

$$S_1 \oplus T^{-(+1)} S_2 = W_j \oplus T^{-j} W_j = (I \oplus T^{-j}) W_j \qquad (11')$$

and hence $$W_{je} = (I \oplus T^{-j})^{-1}(S_1 \oplus T^{-(n+1)} S_2) \qquad (12)$$

$$W_{ie} = S_1 \oplus W_{je} \qquad (13)$$

As seen from the equations (12) and (13), the data dropped, i.e., the error data words, may be decoded by using the syndromes $S_1$ and $S_2$. The data words, when decoded, are $Wi + Wie$ and $Wj + Wje$ and therefore if Wie and Wje are decoded, the ith and jth words Wi and Wj may be decoded.

In this way, the correct original data words Wi and Wj may be decoded by decoding Wie and Wje. The decode system according to the invention to be described later relates mainly to the generation of Wie and Wje.

There is another decoding method for obtaining the syndromes $S_1$ and $S_2$, wherein all of the data words except the error data words are summed. The error words Wi and Wj are directly obtained with the definitions $S'_1 = Wi + Wj$ and $S'_2 = T^{(n+1)-i} Wi + T^{(n+1)-j} Wj$.

The former decoding method in which the error data is corrected with the definition $$P + \sum_{r=1}^{n} \phi\, Wr = S_1 \text{ and } Q + \sum_{r=1}^{n} \phi\, T^{(n+1)-r} Wr = S_2,$$

will further be described in detail. In the description to be given, it is assumed that the series of data words includes six words and that each word includes 4 bits. The T matrix is given by $$T = \begin{bmatrix} 0 & 0 & 0 & 1 \\ 1 & 0 & 0 & 1 \\ 0 & 1 & 0 & 0 \\ 0 & 0 & 1 & 0 \end{bmatrix}$$

This matrix is an auxiliary matrix of a polynomial $1 + x + x^4$. Accordingly, if B = T.A. the signals of the respective 4 bits are $$b_1 = a_4,\ b_2 = a_1 \oplus a_4,\ b_3 = a_2,\ b_4 = a_3$$

Such a T matrix operation will be understood when considering the Galois field $GF(2^4)$ formed by a polynomial ring with $F(x) = x^4 + x + 1$ as a modulus polynomial.

$$x^4 + x + 1 = 0,\ x^4$$

$$= x + 1 x(a_1 + a_2 x + a_3 x^2 + a_4 x^3)$$

$$= a_1 x + a_2 x^3 + a_3 x^3 + a_4 x^4$$

$$= a_4 + (a_1 + a_4) x + a_2 x^2 + a_3 x^3$$

From the above-mentioned equations, it is seen that $$b_1 = a_4,\ b_2 = a_1 + a_4,\ b_3 = a_2,\ \text{and } b_4 = a_3.$$

Figure 1:
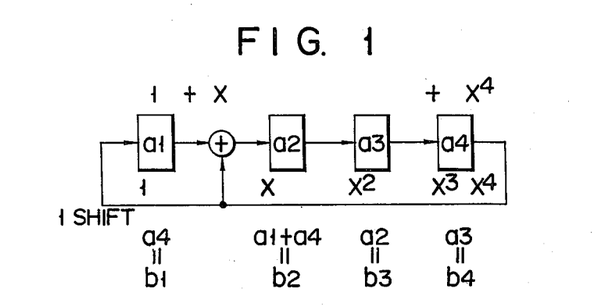
FIGS. 1 to 3 schematically illustrate the principles of the error data correcting system of the instant invention and the use of shift registers in carrying out the invention.

Such an operation may be performed by using a shift register arranged in the form of a polynomial as shown in FIG. 1.

When data A is first loaded into the shift register and it is shifted by one, the T matrix of the data A is operated. When the data A is shifted by n, $T^n A$ is obtained.

The check codes P and Q of the data words $W_1$ to $W_6$ thus obtained are $$P = \sum_{r=1}^{6} \phi\, Wr = W_1 \oplus W_2 \oplus \ldots \oplus W_6 \qquad (14)$$

$$Q = \sum_{r=1}^{6} \phi\, T^{7-i} Wr = T^6 W_1 \oplus T^5 W_2 \ldots \oplus T W_6 \qquad (15)$$

Here, the P code is formed by addition of bits corresponding to the respective words $W_1$ to $W_6$. The addition is represented by the symbol $\oplus$ which corresponds to the exclusive OR of corresponding bits, that is to say, the addition of mod 2. The Q code is generated by the data matrix-operated by the shift register shown in FIG. 1.

In the correcting method described above, even though errors occur in up to two words in the data words $W_1$ to $W_6$, the data words $W_1$ to $W_6$ may be completely decoded.

From the equations (12) and (13), we have $$W_{ie} = S_1 \oplus W_{je} \quad (16)$$

$$W_{je} = (I \oplus T^{i-j})^{-1}(S_1 \oplus T^{i-7} S_2) \quad (17)$$

when $S_1 \oplus T^{-7} S_2 = m$, the equation (17) is rewritten as below $$W_{je} = (I \oplus T^{i-j})^{-1}(S_1 \oplus T^{i-7} S_2) = M_k \cdot m \quad (18)$$

where $$M_k = (I \oplus T^{-k})^{-1} \quad (19)$$

In the equation (19), $k = j - i$. When there are six data words, $M_k$ includes $M_1$ to $M_5$.

For this reason, the decoding of $W_i$, $W_j$ is generally performed by using an M matrix generator, but it is the conventional, general practice to store such M matrix data in a ROM (Read Only Memory) to permit it to be controlled due to its lack of regularity, time, restriction, etc.

The operation of $T^{-n}$ may be made by inverting the shift register shown in FIG. 1 in its connection, and then shifting the inverted one n times. When the T matrix is used as an auxiliary matrix of the polynomial $1 + x + x^4$, $M_1$ to $M_5$ are $$M_1 \begin{bmatrix} 1 & 1 & 1 & 1 \\ 1 & 0 & 0 & 0 \\ 1 & 1 & 0 & 0 \\ 1 & 1 & 1 & 0 \end{bmatrix}, M_2 \begin{bmatrix} 0 & 1 & 0 & 1 \\ 1 & 1 & 1 & 1 \\ 0 & 1 & 1 & 1 \\ 1 & 0 & 1 & 1 \end{bmatrix}, M_3 \begin{bmatrix} 1 & 0 & 0 & 1 \\ 1 & 1 & 0 & 1 \\ 0 & 1 & 1 & 0 \\ 0 & 0 & 1 & 0 \end{bmatrix},$$

$$M_4 \begin{bmatrix} 0 & 1 & 0 & 0 \\ 0 & 1 & 1 & 0 \\ 0 & 0 & 1 & 1 \\ 1 & 0 & 0 & 1 \end{bmatrix}, M_5 \begin{bmatrix} 1 & 0 & 1 & 1 \\ 1 & 1 & 1 & 0 \\ 1 & 1 & 1 & 1 \\ 0 & 1 & 1 & 1 \end{bmatrix}$$

The actual flow of the decoded data will be described in detail. Assume now that data words $W_1$ to $W_2$ of the $W_1$ to $W_6$ are erroneous. Since $i=1$ and $j=2$, $k=1$ by the equation $k = j - i$. First, $$W_{2e} = M_1(S_1 \oplus T^{-6} S_2)$$

$$W_{1e} = S_1 \oplus W_{2e}$$

If $$S_1 = [S'_1, S'_2, S'_3, S'_4]$$

$$S_2 = [h_1, h_2, h_3, h_4]$$

$$W_{1e} = [a_1, a_2, a_3, a_4]$$

$$W_{2e} = [b_1, b_2, b_3, b_4]$$

we have $$S_1 = W_{1e} \oplus W_{2e}$$

$$S_2 = T^6 W_{1e} \oplus T^5 W_{2e}$$

$$S'_4 = a_4 \oplus b_4, \quad h_4 = a_2 \oplus a_1 \oplus a_4 \oplus b_3 \oplus b_2$$

$$S'_3 = a_3 \oplus b_3, \quad h_3 = a_1 \oplus a_3 \oplus b_2 \oplus b_1 \oplus b_4$$

$$S'_2 = a_2 \oplus b_2, \quad h_2 = a_4 \oplus a_2 \oplus b_1 \oplus b_3$$

$$S'_1 = a_1 \oplus b_1, \quad h_1 = a_3 \oplus a_2 \oplus b_4 \oplus b_3 T^{i-7} S_2$$

obtained is $$T^{i-7} S_2 = T^{-6} S_2 = T^{-6}(T^6 W_{1e} \oplus T^5 W_2)$$
$$= W_{1e} \oplus T^{-1} W_{2e}$$

Therefore, if $T^{-6} S_2 = [l_1, l_2, l_3, l_4]$ $$T^{-6} S_2 = W_{1e} \oplus T^{-1} W_{2e}$$

$$l_4 = a_4 \oplus b_1$$

$$l_3 = a_3 \oplus b_4$$

$$l_2 = a_2 \oplus b_3$$

$$l_1 = a_1 \oplus b_2 \oplus b_1$$

Let us obtain m, i.e. $S_1 + T^{-6} S_2$.

$$S_1 \oplus T^{-6} S_2 = W_{1e} \oplus W_{2e} \oplus T^{-1} W_{2e} = W_{2e} \oplus T^{-1} W_{2e}$$

$$S_1 \oplus T^{-6} S_2 = W_{2e} \oplus T^{-1} W_{2e}$$

$$m_4 = b_4 \oplus b_1$$

$$m_3 = b_3 \oplus b_4$$

$$m_2 = b_2 \oplus b_3$$

$$m_1 = b_1 \oplus b_2 \oplus b_1$$

where $$m = [m_1, m_2, m_3, m_4].$$

From the equation (18), $$W_{2e} = M_k \cdot m$$

$$W_{2e} = (I \oplus T^{-1})^{-1}(S_1 \oplus T^{-2} S_2)$$

Here $M_1$ of the M matrix is used for $(1 \oplus T^{-1})^{-1}$.
When $m_1$ to $m_3$ of $m_4$ to $m_1$ are all summed, $$\sum_{r=1}^{3} m_r = b_3 \oplus b_4 \oplus b_2 \oplus b_3 \oplus b_2 = b_4$$

Accordingly, $b_4$ may be decoded.

Similarly, $b_3$ is decoded by $m_1$ and $m_2$; $b_2$ by $m_1$; $b_1$ by $m_1$ to $m_4$. $W_{2e} = M \cdot m$ and M is already known as described above. Therefore, by multiplying $M_1$ by m, $W_{2e}$ may be decoded.

Before proceeding with the description of $M_1$ to $M_5$, the operation of the Galois field will be described. The Galois field $GF(2^4)$ is formed by the polynomial ring of which the modulus polynomial is $F(x) = x^4 + x + 1$. The expression of the Galois field GF($2^4$) is tabulated in the following table. In the table, $\alpha^4+\alpha+1=0$.

| Exponent of $\alpha$ | denear coupling of 1, , $^2$, $^3$ | Vector expression |
|---|---|---|
| — | 0 | 0 0 0 0 |
| $\alpha^0$ | 1 | 1 0 0 0 |
| $\alpha^1$ | $\alpha$ | 0 1 0 0 |
| $\alpha^2$ | $\alpha^2$ | 0 0 1 0 |
| $\alpha^3$ | $\alpha^3$ | 0 0 0 1 |
| $\alpha^4$ | $1 + \alpha$ | 1 1 0 0 |
| $\alpha^5$ | $\alpha + \alpha^2$ | 0 1 1 0 |
| $\alpha^6$ | $\alpha^2 + \alpha^3$ | 0 0 1 1 |
| $\alpha^7$ | $1 + \alpha \quad + \alpha^3$ | 1 1 0 1 |
| $\alpha^8$ | $1 + \alpha^2$ | 1 0 1 0 |
| $\alpha^9$ | $\alpha + \alpha^3$ | 0 1 0 1 |
| $\alpha^{10}$ | $1 + \alpha + \alpha^2$ | 1 1 1 0 |
| $\alpha^{11}$ | $\alpha + \alpha^2 + \alpha^3$ | 0 1 1 1 |
| $\alpha^{12}$ | $1 + \alpha + \alpha^2 + \alpha^3$ | 1 1 1 1 |
| $\alpha^{13}$ | $1 \quad\quad \alpha^2 + \alpha^3$ | 1 0 1 1 |
| $\alpha^{14}$ | $1 \quad\quad\quad + \alpha^3$ | 1 0 0 1 |

In the table, $\alpha$ is a root in the Galois field GF($2^4$) of $x^4+x+1$. As seen from the vector expression, the multiplication of $\alpha^i$ by $\alpha$ is performed in a manner that the vector expression of $\alpha^i$ is set in the circuit shown in FIG. 2 and it is shifted by one time. Accordingly, the multiplication of $\alpha^i$ by $\alpha^j$ is made by shifting it j times.

Figure 2:
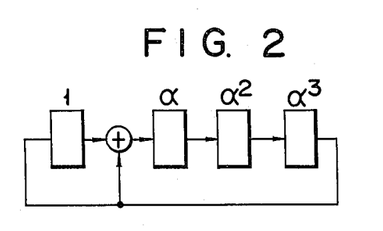

A circuit for effecting a division by $\alpha$, that is, the circuit for effecting $\alpha^{-1}$, may be realized by inverting the circuit in FIG. 2 in its connection. Here, if $x^4+x+1=0$ and $x=1/y$, we have $y^{-4}+y^{-1}+1=0$ and if it is multiplied by $x^4$, $$y^4+y^3+1=0 \tag{20}$$

In the version of the equation, apparently, $\alpha^{15}=\alpha^0$. Further, $\alpha(1+\alpha^3)=\alpha+\alpha^4=1$ and therefore, it is seen that $\alpha^{-1}$ is equal to $\alpha^{14}$.

If a dividend $\alpha^i=(a_1, a_2, a_3, a_4)=a_1+a_2x+a_3x^2+a_4x^3$, $$\begin{aligned}\alpha^i\alpha^{-1} &= (a_1 + a_2x + a_3x^2 + a_4x^3)(1 + x^3) \\ &= a_1 + a_2x + a_3x^2 + a_4x^3 + a_2x^2 + a_3x^5 + \\ &\quad a_4x^6 = (a_1 + a_2) + a_3x + a_4x^2 + a_1x^3\end{aligned} \tag{21}$$

When $F(x)=x^4+x^3+1$ is a modulus polynomial, $$\begin{aligned}x^4 &= 1 + x^3 \\ \alpha^i\alpha^{-1} = \beta_i\beta &= (a_4 + a_3x + a_2x^2 + a_1x^3)x \\ &= a_4x + a_3x^2 + a_2x^2 + a_1x^4 \\ &= a_1 + a_4x + a_3x^2 + (a_1 + a_2)x^3\end{aligned} \tag{22}$$

Figure 3:
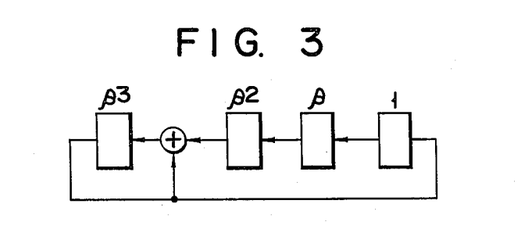

As seen from the above, the division is made by the inversion of the circuit. The circuit divided by $\alpha$ is shown in FIG. 3.

In view of the above-mentioned points, the M matrix in the equation (18) will be described.

$$Wje=(1\oplus T^{i-j})^{-1}(S_1\oplus T^{i-7}S_2) \tag{23}$$

where $$S_1+T^{i-7}S_2=(m_1, m_2, m_3, m_4)=m_1+m_2x+m_3x^2+m_4x^3$$

In this case, i and j each ranges from 1 to 6 and accordingly $$i-j=-1 \text{ to } -5.$$

When considering this in the Galois field GF($2^4$) with the modulus polynomial of $F(x)=x^4+x^3+1$, $$S_1+T^{i-7}S_2=m_4+m_3x+m_2x^2+m_1x^3=\beta_i$$

$$Wje=(I+\beta^k)^{-1}\beta_i \tag{24}$$

$(k=1\sim5)$
When $k=1$, $$(1 \oplus \beta^k)^{-1} = \frac{1}{1+x} = \frac{x^4+x^3}{x+1} = x^3 \tag{25}$$

$$\begin{aligned}Wje &= x^3(m_4 + m_3x + m_2x^2 + m_1x^3) \tag{26} \\ &= m_4x^3 + m_3x^4 + m_2x^5 + m_1x^6 \\ &= m_4x^3 + m_3 + m_3x^3 + m_2 + m_2x + m_2xx^3 + m_1 + \\ &\quad\quad m_1x + m_1x^2 + m_1x^3 \\ &= (m_1 + m_2 + m_3) + (m_1 + m_2)x + m_1x^2 + \\ &\quad\quad (m_1 + m_2 + m_3 + m_4)x^3\end{aligned}$$

Rewriting this into a linear coupling of the Galois field with the modulus polynomial of $F(x)=x^4+x+1$, we have $$\begin{aligned}Wje &= (m_1+m_2+m_3+m_4)+m_1x \\ &\quad +(m_1+m_2)x^2+(m_1+m_2+m_3)x^3\end{aligned} \tag{27}$$

It is seen that the equation (27) is equal to the $M_1$ matrix (or the vector diagram) of the M matrix. Similarly, when $k=2$, $$(1 \oplus \beta^2)^{-1} = \frac{1}{x^2+1} = \frac{1^2}{x^2+1} = \frac{x^4+x^3}{(x+1)} \cdot \frac{x^4+x^3}{(x+1)} \tag{28}$$

$$= x^3 \cdot x^3 = 1 + x + x^2 + x^3$$

When the vector at this time is obtained, it is equal to the $M_2$ matrix of the M matrix.

When $k=1$, the multiplication of $x^3$ is made in $F(x)=x^4+x^3+1$. To be specific, $S_1+T^{i-7}S_2$ is set in the circuit of FIG. 3 at an inverse position and it is shifted three times. The remaining signal left in the shift register after shifting three times is Wje.

When $k=2$, the shift register is shifted six times.

In investigating the Galois field GF($2^4$) with the modulus polynomial of $F(x)=x^4+x+1$, from the equation (23), we have $$\begin{aligned}Wje &= (I \oplus T^{i-j})^{-1}(m_1 + m_2x + m_3x^2 + m_4x^3) \tag{29} \\ &= (1 + \alpha^{-1})^{-1}(m_1 + m_2x + m_3x^2 + m_4x^3) \\ &= (1 + 1 + x^3)^{-1}(m_1 + m_2x + m_3x^2 + m_4x^3) \\ &= (x^3)^{-1}(m_1 + m_2x + m_3x^2 + m_4x^3)\end{aligned}$$

$$= \frac{(x^4+x)^3}{(x)^3}(m_1 + m_2x + m_3x^2 + m_4x^3)$$

$$\begin{aligned}&= (1 + x + x^2 + x^3)(m_1 + m_2x + m_3x^2 + m_4x^3) \\ &= (m_1 + m_2 + m_3 + m_4) + m_1x + (m_1 + m_2)x^2 + \\ &\quad\quad (m_1 + m_2 + m_3)x^3\end{aligned}$$

Accordingly, the equation (29) is equal to the equation (27).

In other words, $(S_1\oplus T^{i-7}S_2)=(m_1, m_2, m_3, m_4)$ is set in the shift register shown in FIG. 2 and $(1+x+x^2=\alpha^{12})$ is shifted therein 12 times. At this time, the data left in the shift register is Wje, as seen from the above-mentioned table.

As seen from the foregoing description, the decoding may be performed on the basis of the polynomial upon which the matrix T depends. Accordingly, it is evident that decoding may be made by the shift register connected in the polynomial manner.

As seen from the foregoing description, it is apparent that the vector space in the Galois field $GF(2^4)$ with the modulus polynomial of $F(x)=x^4+x+1$ develops the T matrix, the $M_1$ to $M_5$ matrices and a $T^{-1}$ matrix to be described later.

In the operation of $T^{-1}$, $F(x)=x^4+x^3+1$ is used and this is a reciprocal polynomial for $F(x)=x^4+x+1$. Further, it is apparent that the angle of viewing the original data is also inverted.

Further, it is apparent that, when each data is comprised of 4 bits, the polynomial is of fourth degree and its vector spaces are 16 kinds only. That is, the operation of two elements a and b allows a maximum of 15 shifts when the operation circuit is embodied as a shift register.

When the operation circuit by mere shift registers is used, if the degree of the polynomial is large, it is necessary to shift the shift register by $2^{12}$ to $2^{14}$, so that the operation takes a long time. If the data words are being transmittal by PCM or the like, the time taken for decoding processing is limited. It is for this reason that the M matrix for decoding, such as the $M_1$ to $M_5$ matrixes are loaded into a ROM (read only memory) although such a process requires extensive hardware capability. The matrices are sequentially read out to select the signal $S_1+T^{i-(n+1)}S_2$ and decode it.

Data correction as accomplished by the data correcting system according to the instant invention will now be explained.

As described above, the check code Q depends on the auxiliary matrix of the polynomial $X^m+X^g+1$. It is also seen from the foregoing description that the M matrix therefor error correction comprises a space vector generated in the Galois field $(2^m)$ with the polynomial of $x^m+x^g+1$.

The nature of the M matrix will be described by rewriting the T matrix to have the same relations as the matrices $M_1$ have to $M_5$ to the respective bits.

$$T = \begin{array}{c|cccc} & a_1 & a_2 & a_3 & a_4 \\ \hline b_1 & 0 & 0 & 0 & 0 \\ b_2 & 1 & 0 & \oplus 0 & 1 \\ b_3 & 0 & 1 & 0 & 0 \\ b_4 & 0 & 0 & 1 & 0 \end{array}$$

Figure 4:
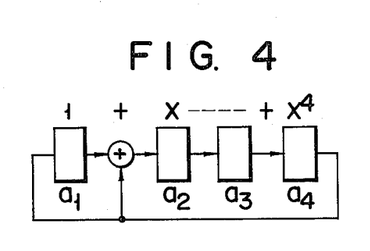
FIG. 4 is another block diagram for illustrating the principle of the error data correcting system of the instant invention.

Columns ($a_1$ $a_2$ $a_3$ $a_4$) are assumed to be numerals set in a computing circuit with a modulus polynomial of $F(x)=x^4+x+1$. On this assumption, when ($a_1$) in the shift register circuit shown in FIG. 4 is set with "1" and it is shifted by one, the column ($a_1$) is generated. Similarly, when "1" is set to only the ($a_2$) and it is shifted by one, the column ($a_2$) is generated. When "1" is set to only the ($a_3$) and is shifted by one, the column ($a_3$) is produced. When only ($a_4$) is set to "1" and shifted by one, the column ($a_4$) is produced.

The relations may also be explained in the following. When "1" is set in only the ($a_1$) in position FIG. 4 and is shifted by one, the column ($a_1$) is produced. If "1" is set in the ($a_1$) position and is shifted by two, the column ($a_2$) is produced. Similarly, the column ($a_3$) is produced by three shifts and the column ($a_4$) is produced for four shifts.

Those relations will be considered by using the B row representing the result of the computation. The column $b_3$ will be considered first.

A signal at the cross-point of $b_3$ and $a_4$, corresponds to a signal at the cross-point of $b_2$ and $a_3$. The signal at the cross-point of $b_2$ and $b_3$ corresponds to the sum of the signals at the cross-points $b_4$ and $a_2$ and $b_1$ and $a_2$. The signal at the cross point of $b_1$ and $b_2$ corresponds to the signal at the cross point of $b_4$ and $a_1$. Therefore, the signal at the cross point of $b_3$ and $a_4$ corresponds to the sum of the signals at the cross-points $b_4$ and $a_1$, and $b_4$ and $a_2$.

The signal for the $b_3$ and $a_3$ combination corresponds to the signal for the $b_4$ and $a_4$ combination; the signal for the $b_3$ and $a_2$ combination corresponds to the signal for the $b_4$ and $a_3$ combination; the signal for the $b_3$ and $a_1$ combination to that for the $a_4$ and $a_2$ combination. In this manner, the column $b_4$ may be obtained by using the signal of the column $b_4$.

For row $b_1$, the signal at the cross point of $b_1$ and $a_3$ is the sum of the signals at the cross points $b_4$ and $a_3$, and $b_1$ and $a_3$. A signal at the cross point of $b_2$ and $a_4$ is the sum of the signals at the cross points $b_4$ and $a_3$ and $b_1$ and $a_3$. Similarly, the signal for the cross point $b_1$ and $a_2$ is the sum of the signals for the cross points $b_2$ and $a_2$, and $b_4$ and $a_1$; a signal for the cross point $b_1$ and $a_1$ is the sum of the signals for the cross points $b_2$ and $a_2$, and $b_4$ and $a_1$. A signal for the cross point $b_1$ and $a_4$ is equal to the signal for the cross point $b_4$ and $a_3$; a signal for $b_3$ and $a_2$ is equal to the signal for the cross point $b_2$ and $a_1$. Therefore, it is the total sum of the signals for the cross points $b_2$ and $a_1$, $b_2$ and $a_2$, and $b_4$ and $a_4$.

Figure 5:
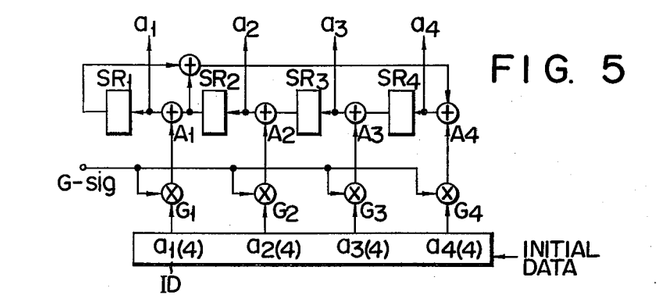
FIG. 5 is a block diagram of a decoding matrix generating circuit used in the invention.

This relation may be expressed in terms of the circuit shown in FIG. 5 which is a decoding matrix generating circuit used in the present invention. All the shift registers SR1 to SR4 are first cleared. Then, a gate signal G-sig is activiated through gate circuits $G_1$ to $G_4$ and $A_1$ to $A_4$ for multiplication and addition, the output signals $a_1$ to $a_4$ derived from the output terminals of the shift register form the column $b_4$. Then, the respective registers are shifted by one to deactivate the gate signal G-sig, so that the output signals from the output terminals $a_1$ to $a_4$ form the row $b_3$. When an additional shift by one is performed, the terminals produce output signals to form the row $b_2$. An additional shift by one to causes the output terminals to produce signals forming the row $b_1$.

Let us consider the rewritten matrix from another aspect. The row $b_2$ is formed depending on the contents of the rwo $b_3$. The row $b_3$ depends on the contents of the row $b_4$. With respect to the columns $b_3$ and $b_4$, a signal at the cross point of $b_1$ and $a_2$ is equal to the signal at the cross point of $b_4$ and $a_1$: a signal for the cross point $b_1$ and $a_3$ is equal to the signal for the cross point $b_4$ and $a_2$; a signal for the cross point $b_1$ and $a_4$ is equal to the signal for the cross point $b_4$ and $a_3$; a signal for the cross point $b_4$ and $a_4$ is equal to the signal for the cross point $b_2$ and $a_2$. Accordingly, the row $b_4$ is equal to the sum of the signal for the cross point $b_1$ and $a_1$ and the signal for the cross point $b_4$ and $a_1$, that is, the sum of the signals for the cross points $b_1$ and $a_1$, and $b_1$ and $a_2$. Therefore, the row $b_4$ is formed depending on the contents of the row $b_1$.

Figure 6:
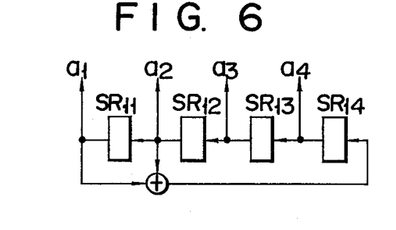
FIG. 6 illustrates an alternate embodiment of the decoding matrix generating circuit of FIG. 5.

FIG. 6 shows another decoding matrix circuit embodying the above relations. First, data of the row $b_1$ is set in the respective registers SR11 to SR14. The output terminals $a_1$ to $a_4$ produce the data of the row $b_1$. Then, the respective registers are shifted by one thereby to produce the data of the row $b_4$. Similarly, additional one shift produces the data of the row $b_3$ and an additional one shift provides the data of the row $b_2$. It is evident that, if those shift registers are shifted in the opposite direction, those data are generated in the inverted order to that as mentioned above.

As described above, the data as seen from the row b may be formed. This feature is for the case of the M matrix.

In short, a specific matrix in the M matrix is selected by using the decoding matrix generating circuit shown in FIG. 5 or FIG. 6. An initial value is selected by an initial data generating portion (ID) which is not shown in FIG. 6. In this way, all of the matrix data $M_1$ to $M_5$ in the M matrix may be generated by a single circuit construction, without storing them in the read only memory.

The explanation to follow is for a case where the circuit shown in FIG. 6 is used in place of the conventional M matrix generator constructed by the ROM and AC (address counter).

Assume now that, in a series data of n data words, errors occur in the c-th and d-th word and $W'c = Wc + Wce$ and $Wd' = Wd + Wde$. If $d-c=k$, from equations (7), (8), (12) and (13)

$$Wce = S_1 \oplus Wde \quad (30)$$

$$Wde = (I \oplus T^{-k})^{-1}(S_1 \oplus T^{c-(n+1)}S_2) \quad (31)$$

where $S_1 = Wce \oplus Wde$ $$S_2 = T^{(n+1)-c}Wce \oplus T^{(n+1)-d}Wde$$

When $Wde = (b_1\ b_2\ b_3\ b_4)$ and $S_1 \oplus T^{c-(n+1)}S_2 = (m_1\ m_2\ m_3\ m_4)$ and the row a for decoding $b_4$ is given by $(a_1\ a_2\ a_3\ a_4)$, we have $$b_4 = m_1 a_1 \oplus m_2 a_2 \oplus m_3 a_3 \oplus m_4 a_4 \quad (32)$$

$$b_3 = m_1 a_2 \oplus m_2 a_3 \oplus m_3 a_4 \oplus m_4(a_1 \oplus a_2) \quad (33)$$

$$b_2 = m_1 a_3 \oplus m_2 a_4 \oplus m_3(a_1 \oplus a_2) \oplus m_4(a_2 \oplus a_3) \quad (34)$$

$$b_1 = m_1(a_4 \oplus a_1) \oplus m_2(a_1 \oplus a_2 \oplus a_2) \oplus m_3(a_2 \oplus a_3 \oplus a_3) \oplus m_4(a_3 \oplus a_4 \oplus a_4) \quad (35)$$

Rearranging the equations (32), (33), (34) and (35), $b_4$ to $b_1$ are given as follow $$b_4 = a_1 m_1 \oplus a_2 m_2 \oplus a_3 m_3 \oplus a_4 m_4 \quad (36)$$
$$b_3 = a_1 m_4 \oplus a_2(m_4 \oplus m_1) \oplus a_3 m_2 \oplus a_4 m_3 \quad (37)$$
$$b_2 = a_1 m_3 \oplus a_2(m_3 + m_4) \oplus a_3(m_1 \oplus m_4) + a_2 m_2 \quad (38)$$
$$b_1 = a_1(m_1 \oplus m_2) \oplus a_2 m_3 \oplus a_3 m_4 \oplus a_4 m_1 \quad (39)$$
$$= (a_1 m_1 \oplus a_2 m_2 \oplus a_3 m_3 \oplus a_4 m_4) \oplus a_1 m_2 \oplus a_2(m_2 \oplus m_3) \oplus a_3(m_3 \oplus m_4) \oplus a_4(m_1 \oplus m_4)$$
$$= b_4 \oplus b'_1$$

Where
$$b_1' = a_1 m_2 \oplus a_2(m_2 \oplus m_3) \oplus a_3(m_3 \oplus m_4) \oplus a_4(m_1 \oplus m_4) \quad (40)$$

As seen from the equations (36), (37), (38), (39) and (40), $b_4$ to $b_1$ may be decoded when $(m_1\ m_2\ m_3\ m_4)$ is changed while $(a_1\ a_2\ a_3\ a_4)$ is fixed.

It is further understood that the signal $(m_1\ m_2\ m_3\ m_4)$ is equivalent to the vector change of the data computed by the matrix T.

Specifically, if $S_1 \oplus T^{c-(n+1)}S_2 = (m_1\ m_2\ m_3\ m_4)$ and the computing matrix for decoding $b_4$ is $(a_1\ a_2\ a_3\ a_4)$, it is multiplied by the respective bits and the total sum of them is $b_4$. The set of values $(m_1\ m_2\ m_3\ m_4)$ is set in the shift register in FIG. 4 and is shifted by one. Then, the output signal from the shift register is multiplied by $(a_1\ a_2\ a_3\ a_4)$ thereby $b_1'$. Since $b_1'$ is $b_1 \oplus b_4$, $b_1$ may be decoded by summing $b_4$ as previously decoded and $b_1'$.

As seen from the foregoing, the error data correcting system according to the invention can perform decoding by computing the data of $S_1 \oplus T^{c-(n+1)}S_2$ by using the matrix generating circuit for producing only the matrix to decode a bit, without the conventional complicated decoding M matrix generator.

Thus, when the matrix generating circuit according to the invention is used, a single bit matrix is satisfactory for the decoding matrix data generated, so that the circuit used is simplified and is operable at low speed. Therefore, the matrix generating circuit is useful when it is used for the case where the length of the data word is large.

Figure 7:
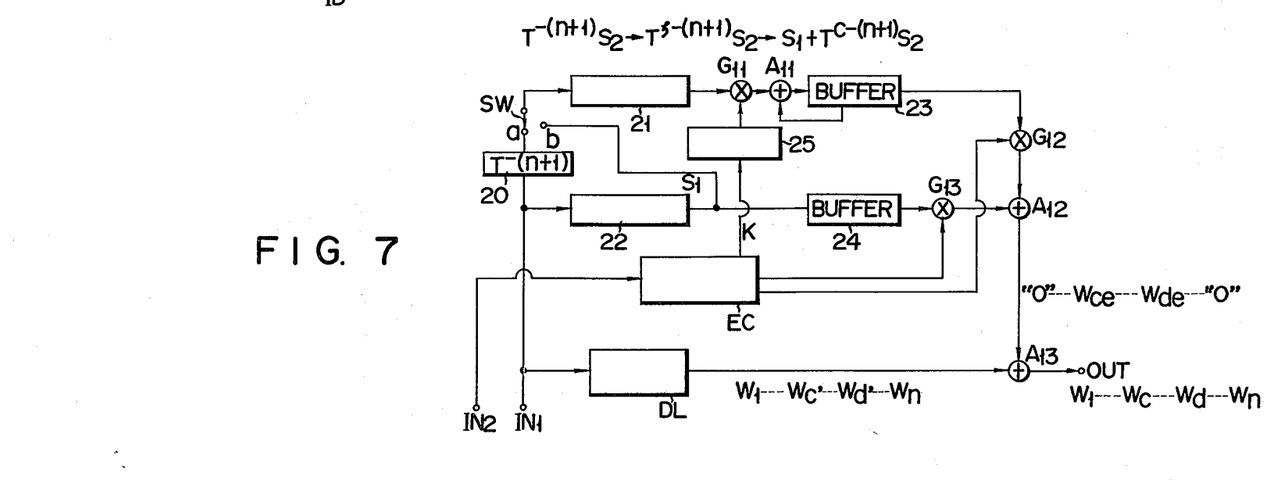
FIG. 7 is a block diagram of an error data correcting system according to the invention.

FIG. 7 shows an error data correcting system constructed on the basis of the principle as mentioned above. A data input signal to be corrected is applied to an input terminal $IN_1$ of the error data correcting system. In the data input signal, n data words and two check words expressed by $W_1$ to WnPQ are used as one block or series of data words. The data input signal is applied to a Q register 21 as a Q decoding circuit, via a $T^{-(n+1)}$ computing or operation circuit 20 for performing $T^{-(n+1)}$. At this time, a switch SW is set to a contact a. The data input signal is also applied to a P register 22 as a P decoding circuit.

The Q register 21 may be the T matrix operation circuit as shown in FIG. 4 and has the contents of $T^{-(n+1)}S_2$ when the data input signal as mentioned above is supplied thereto. If the first error word is Wc, the Q register 21 is shifted C times to store the output of $T^{c-(n+1)}S_2$. The switch SW is then turned to a contact b, so that the syndrome $S_1$ derived from the P register 22, which may be the mere exclusive OR as mentioned above, is added to the contents of the Q register 21 to provide $S_1 + T^{c-(n+1)}S_2$.

An error word control circuit EC is provided where the interval data k between the first error word Wc and the second error word Wd is checked and is applied to an matrix generating circuit 25 comprised as mentioned above. Upon receipt of the interval data k, the matrix generating circuit 25 selects matrix data to decode a specific bit, and applies the selected matrix data to a gate circuit G11. The gate G11 multiplies the matrix data for the specific data decoding matrix with the data from the Q register 21 thereby to obtain the correcting data $W_{de}$. At this time, the syndrome $S_1$ is applied from the P register 22 to a buffer circuit 24.

The Wce, as decoded and generated, is added to the $S_1$ in the adder $A_{12}$, so that the $W_{ce}$ is decoded and generated. In this case, the corrected data Wce and the $S_1$ are applied to the adder $A_{12}$, through gate circuits $G_{12}$ and $G_{13}$ enabled by a signal derived from the error control circuit (EC).

Part of the input data signal is directly applied to an adder $A_{13}$ through a delay circuit (DL) after being delayed by one data block. When the input data signal has no error, the decoding section produces "0". In this case, the input data signal is accordingly derived from the output terminal (OUT).

When the first error word Wc' comes in, the decoded Wce is transferred to an adder $A_{13}$, so that the correct data Wc is reproduced and is supplied to the output terminal (OUT). When the second error word Wd' comes in, the gate circuit ($G_{13}$) is disabled and therefore the addition of the $S_1$ is not performed in the adder $A_{13}$, so that the Wde is transferred directly to the adder $A_{14}$. As a result, the correct data Wd is reproduced and derived from the output terminal (OUT).

As recalled, the Wce and Wde designate the dropped cth and dth data. Accordingly, through the above-mentioned operation, the data words $W_1$ to $W_n$ including such error data are correctly decoded.

The error word control circuit (EC) controls the decoding matrix generator circuit 25 in such a way that the interval between the error words, i.e., the information k, is checked and the matrix data for the specific bit decoding is produced corresponding to the interval checked. Also this may easily be realized by detecting a cyclic redundancy check signal attached to the input data signal, for example by a known cyclic redundancy check codes generating circuit (CRCC) including a shift register and the like known as an error pointer. In this case the error pointer is applied through another input terinal ($IN_2$).

If the T matrix is for a polynomial $F(x)=x^n+x^t+1$, when the decoding is made from Msb, the data succeeding to the $(n-1)\oplus 1$ is corrected by adding the data preceding the $(n-t)$ to the elements. Incidentally, in FIG. 7, $A_{11}$ to $A_{13}$ and $G_{11}$ to $G_{13}$ are gate circuits for addition and multiplication.

Let us consider a case where the circuit shown in FIG. 6 is used in place of the conventional decoding M matrix generator including the ROM and the address counter AC. Assume that the information data consists of n words, that errors take place in the c-th and d-th words, and that Wc'=Wc+Wce and Wd'=Wd+Wde, and $d-c=k$.

As in the previous case, we have from (7), (8), (12) and (13)

$$Wce = S_1 \oplus Wde \quad (30)$$

$$Wde = (I \oplus T^{-c})^{-1}(S_1 \oplus T^{c-(n+1)}S_2) \quad (31)$$

where $$S_1 = Wce \oplus Wde$$

$$S_2 = T^{(n+1)-c}Wce \oplus T^{(n+1)-d}Wde$$

when $Wde=(b_1b_2b_3b_4)$, $S_1+T^{c-(n+1)}S_2=(m_1m_2m_3m_4)$, and $b_1$ is $(a_1a_2a_3a_4)$ as a matrix to be decoded, we have $$b_1 = m_1a_1 \oplus m_2a_2 \oplus m_3a_3 \oplus m_4a_4 \quad (41)$$

$$b_4 = m_1a_2 \oplus m_2a_3 \oplus m_3a_4 \oplus m_4(a_1+a_2) \quad (42)$$

$$b_3 = m_1a_3 \oplus m_2a_4 \oplus m_3(a_1 \oplus a_2) \oplus m_4(a_2 \oplus a_3) \quad (43)$$

$$b_2 = m_1a_4 \oplus m_2(a_1 \oplus a_2) \oplus m_3(a_2 \oplus a_3) \oplus m_4(a_3 \oplus a_4) \quad (44)$$

Rearranging those equations (41)~(44), $b_1$ to $b_4$ are $$b_1 = a_1m_1 \oplus a_2m_2 \oplus a_3m_3 \oplus a_4m_4 \quad (45)$$

$$b_4 = a_1m_4 \oplus a_2(m_1 \oplus m_4) \oplus a_3m_2 \oplus a_4m_3 \quad (46)$$

$$b_3 = a_1m_3 \oplus a_2(m_3 \oplus m_4) \oplus a_3(m_1 \oplus m_4) \oplus a_4m_2 \quad (47)$$

$$b_2 = a_1m_2 \oplus a_2(m_2 \oplus m_3) \oplus a_3(m_3 \oplus m_4) \oplus a_4(m_1 \oplus m_4) \quad (48)$$

As evident from equations (45) to (48), the corrected data is decoded in a manner such that the matrix ($a_1$ $a_2$ $a_3$ $a_4$) for decoding $b_1$ is fixed and $S_1+T^{c-(n+1)}S_2=(m_1$ $m_2$ $m_3$ $m_4$) is computed.

In this example, the gate circuit is not used $A_{11}$ in the FIG. 7 circuit. The order of the data inputted into the buffer circuit is not MSB (most significant bit) to LSB (least significant bit). The remainder of the example is the same as explained above with reference to FIG. 7. For inverting the decoding order, the shift register is inverted.

As seen from the foregoing, the error data correcting system according to the invention has an excellent performance with a simple matrix generating circuit.

The error data correcting system according to the invention is readily adaptable for a system for transmitting, recording and reproducing digitized information signals by PCM, for example, and other digital systems as well.

What is claimed is:

1. An error data correcting system in which a series of n data words $W_1$ through $W_n$ each including m bits has associated therewith a P check code $$\left( P \oplus \sum_{r=1}^{p} W_r = 0 \right)$$

and a Q check code $$\left( Q \oplus \sum_{r=1}^{n} T^{(n+1)-r} W_r = 0 \right),$$

the system for correcting erroneous data words $W_c$, and $W_d$, to produce correct data words $W_c$ and $W_d$ ($1 \leq c < d \leq n$), the system generating a first syndrome value $$S_1 = P \oplus \sum_{r=1}^{n} W_2 \neq 0$$

and a second syndrome value $$S_2 = Q \oplus \sum_{r=1}^{n} T^{(n+1)-r} W_r \neq 0$$

when the series of data words includes erroneous data words $W_{c'}$, and $W_{d'}$, respectively, the system comprising:

a first input terminal for receiving said series of data words and said associated first and second syndrome values;

an auxiliary matrix circuit for multiplying said first syndrome value by an auxiliary matrix $T^{-(n+1)}$;

a T matrix operation circuit for receiving the output of said auxiliary matrix circuit and for shifting said received value c positions to output $T^{c-(n+1)} S_2$;

a P register coupled to said first input terminal for receiving said first syndrome value;

switch means for selectively coupling the output of said P register to the input of said T matrix operation circuit to cause said T matrix operation circuit to store $S_1 + T^{c-(n+1)} S_2$;

a second input terminal for receiving an error data pointer;

an error word control circuit coupled to said second input terminal for generating an interval signal $k = d - c$ corresponding to the series positional difference between said second error word $W_{d'}$ and said first error word $W_{c'}$ in response to said error data pointer;

a first gate circuit coupled to the output of said T matrix operation circuit;

a matrix generating circuit for receiving said interval signal k from said error word control circuit, for generating a matrix signal corresponding to a specific bit in the output of said T matrix operation circuit, and for supplying said matrix signal to said first gate circuit, said first gate circuit for combining said output of said T matrix operation circuit ($T^{c-(n+1)} S_2$) with said matrix signal k to generate a second corrected data word $W_{de}$;

a first buffer for storing said second corrected data word $W_{de}$;

a second buffer coupled to said P register for receiving and storing said first syndrome value $S_1$; and means coupled to said first buffer for receiving said second corrected data word $W_{de}$ and to said second buffer for receiving said first syndrome value $S_1$ and for combining said second corrected data word $W_{de}$ and said first syndrome value $S_1$ to generate a first corrected data word $W_{ce}$.

2. An error data correcting system according to claim 1 wherein said receiving and combining means comprises:

an adder coupled to said first buffer for receiving said second corrected data word $W_{ce}$; and a second gate circuit coupled to said second buffer and said adder to selectively supply said first syndrome value $S_1$ to said adder to enable said adder to add said first syndrome value $S_1$ and said second corrected data word $W_{de}$ to generate said first corrected data word $W_{ce}$.

3. An error data correcting system according to claim 2 further including:

an output terminal;

means for transferring said series of data words $W_l$ through $W_n$ including said error data words $W_{c'}$ and $W_{d'}$ from said input terminal to said output terminal; and means for replacing said first and second error data words $W_{c'}$ and $W_{d'}$ with said first and second corrected data words $W_{ce}$ and $W_{de}$, respectively, as said series of data words are transferred from said input terminal to said output terminal.

4. An error data correcting system according to claim 3 wherein said transferring means comprises a delay circuit.

5. An error data correcting system according to claim 1 wherein said T matrix operation circuit comprises:

a serial to parallel converter for converting said output of said auxiliary matrix to a plurality of parallel data words;

a plurality of shift registers, each of said shift registers being associated with a different one of said plurality of parallel data words;

a plurality of adder circuits, each of said adder circuits being connected between a different pair of said shift registers;

a plurality of gate circuits in one-to-one association with said plurality of parallel data words, each of said gate circuits being coupled to said adder circuit preceding said shift register associated with said parallel data word associated with said gate circuit; and means for controlling said gate circuits to enable the selective transfer of said parallel data words to said associated shift registers.

* * * * *

UNITED STATES PATENT AND TRADEMARK OFFICE
CERTIFICATE OF CORRECTION

PATENT NO. : 4,368,533
DATED : January 11, 1983
INVENTOR(S) : TADASHI KOJIMA

It is certified that error appears in the above—identified patent and that said Letters Patent is hereby corrected as shown below:

Claim 5, Col. 16, line 30, change "pluraity" to --plurality--.

Signed and Sealed this

Fifth Day of July 1983

[SEAL]

Attest:

Attesting Officer

GERALD J. MOSSINGHOFF
Commissioner of Patents and Trademarks